(12) United States Patent
Thiagarajan et al.

(10) Patent No.: US 7,838,108 B2
(45) Date of Patent: Nov. 23, 2010

(54) NANO-CELLULAR POLYMER FOAM AND METHODS FOR MAKING THEM

(75) Inventors: Chinniah Thiagarajan, Karnataka (IN); Ravi Sriraman, Karnataka (IN); Tansen Dhananjay Chaudhari, Karnatake (IN); Muniratnam Kumar, Karnataka (IN); Vlkash Kumar Sinha, Karnataka (IN); Asim Pattanayak, Karnataka (IN)

(73) Assignee: Sabic Innovative Plastics IP B.V. (NL)

( * ) Notice: Subject to any disclaimer, the term of this patent is extended or adjusted under 35 U.S.C. 154(b) by 635 days.

(21) Appl. No.: 11/623,910

(22) Filed: Jan. 17, 2007

(65) Prior Publication Data

US 2009/0148665 A1    Jun. 11, 2009

(51) Int. Cl.
*B32B 32/06*    (2006.01)
*C08J 9/18*    (2006.01)

(52) U.S. Cl. ............. 428/315.7; 428/314.4; 428/314.8; 428/315.5; 428/316.6; 428/319.1; 428/319.3; 428/319.7; 521/60

(58) Field of Classification Search ............. 428/314.4, 428/314.8, 315.5, 315.7, 316.6, 319.1, 319.3, 428/319.7; 521/60
See application file for complete search history.

(56) References Cited

U.S. PATENT DOCUMENTS

| 9,936 A | 8/1853 | Delano |
| 38,018 A | 3/1863 | Dick |
| 42,434 A | 4/1864 | Douglas |
| 82,276 A | 9/1868 | Belleville |
| 82,749 A | 10/1868 | Prescott |
| 262,813 A | 8/1882 | Montague |
| 4,025,687 A * | 5/1977 | Wooler et al. ............ 428/594 |
| 5,662,293 A | 9/1997 | Hower et al. |
| 6,284,810 B1 * | 9/2001 | Burnham et al. ............ 521/79 |
| 6,403,663 B1 | 6/2002 | DeSimone et al. |
| 6,555,589 B1 | 4/2003 | Tan |
| 6,555,590 B1 | 4/2003 | Tan |
| 6,593,384 B2 | 7/2003 | Anderson et al. |
| 6,884,377 B1 | 4/2005 | Burnham et al. |
| 6,884,823 B1 | 4/2005 | Pierick et al. |
| 2003/0207082 A1 | 11/2003 | Maas et al. |
| 2004/0082276 A1 * | 4/2004 | Prasad ................. 451/41 |
| 2005/0112331 A1 | 5/2005 | Donea et al. |
| 2006/0127663 A1 * | 6/2006 | Strey et al. ............ 428/317.9 |

(Continued)

FOREIGN PATENT DOCUMENTS

EP    0112155 A2    6/1984

(Continued)

OTHER PUBLICATIONS

International Publication No. 2005/092959 A1; International Publication Date: Oct. 6, 2005; Abstract Only; 1 Page.

(Continued)

*Primary Examiner*—Hai Vo
(74) *Attorney, Agent, or Firm*—Cantor Colburn LLP

(57) ABSTRACT

A nano-cellular polymer foam is disclosed, which has an average pore size from about 10 nanometers to about 500 nanometers; and a foam density that is from about 1 percent to about 50 percent of the bulk density of the material of the nano-cellular foam.

40 Claims, 11 Drawing Sheets

U.S. PATENT DOCUMENTS

2009/0130420 A1* 5/2009 Thiagarajan et al. ........ 428/221
2009/0247654 A1* 10/2009 Rajendran et al. ............. 521/60

FOREIGN PATENT DOCUMENTS

| EP | 1424124 | A1 | 6/2004 |
| WO | 9634039 | A1 | 10/1996 |
| WO | 0018557 | A1 | 4/2000 |
| WO | 0058386 | A1 | 10/2000 |
| WO | 0241987 | A2 | 5/2002 |
| WO | 2005092959 | A1 | 10/2005 |

OTHER PUBLICATIONS

International Search Report; International Application No. PCT/IB2008/000757; International Filing Date: Jan. 17, 2008; Date of Mailing: Apr. 6, 2009; 6 Pages.

Written Opinion of the International Searching Authority; International Application No. PCT/IB2008/000757; International Filing Date: Jan. 17, 2008; Date of Mailing Apr. 6, 2009; 7 Pages.

* cited by examiner

NANO-CELLULAR POLYMER FOAM AND METHODS FOR MAKING THEM

BACKGROUND

The invention relates generally to nano-cellular polymer foams and methods for making them. Further, the invention relates to articles made from the nano-cellular polymer foams.

Polymeric foams are generally used primarily for their cushioning effect, and secondarily for beneficial effects arising out of their structural aspects, such as for example, ability to absorb liquids or energy, thermal insulation, etc. Growing environmental concern and improved performance requirement at a lower weight is a constant research thrust for foam and other materials. The tunable pore morphology of polymeric foams for enhanced properties has not been fully exploited for improving the performance. Currently polymeric foam is dominated by commodity polymers with structural property less than or with in the theoretically possible upper and lower bounds. It is known in the art that reducing the pore size and variation to micrometer level can bring the properties within the lower and upper bounds of classical entitlement. There is a continued need for improving the properties to above the classical upper bound theory while keeping the material weight as low as possible. In summary, this invention is about engineered polymeric foam morphology with superior structural, thermal and dielectric properties and is transparent.

Therefore, there is a need for nano-cellular polymer foams having enhanced properties, and methods for making the foams.

BRIEF DESCRIPTION

Disclosed herein are polymer foams and methods for producing them. The polymer foams have one or more desirable properties, such as optical transparency, and superior structural, thermal and dielectric properties at lower weight to volume ratios, as compared with solid polymer.

In one aspect, a nano-cellular polymer foam is disclosed, which has an average pore size from about 10 nanometers to about 500 nanometers; and a foam density that is from about 1 percent to about 50 percent of the bulk density of the material of the nano-cellular foam.

In another aspect, a method for preparing a nano-cellular foam is disclosed. The method comprises contacting a polymer with a foaming agent, the polymer having an average particle size from about 10 nanometers to about 10 millimeters.

In yet another aspect, a nano-cellular polymer foam is disclosed, which has an average pore size from about 10 nanometers to about 500 nanometers; and a relative density that is from about 5 percent to about 50 percent of the bulk density of the material of the nano-cellular polymer foam; wherein the foam is made of a thermoplastic polymer.

In another aspect, articles made from the method for preparing the nano-cellular foam, as described previously are disclosed.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In this disclosure, nano-cellular polymer foams are disclosed that have a desirable combination of low weight and one or more several additional properties, such as optical transparency, superior structural, thermal, and dielectric properties.

As defined herein, the term "nanometer-sized" is meant to include any or all dimensions measuring from about 10 nanometers up to, but exclusive of about 1000 nanometers. As defined herein, the term "micrometer-sized" is meant to include any or all dimensions measuring from about 1 micron to about 1 millimeter. As defined herein, the term "millimeter-sized" is meant to include any or all dimensions measuring from about 1 millimeter to about 10 millimeters.

Figure 1:
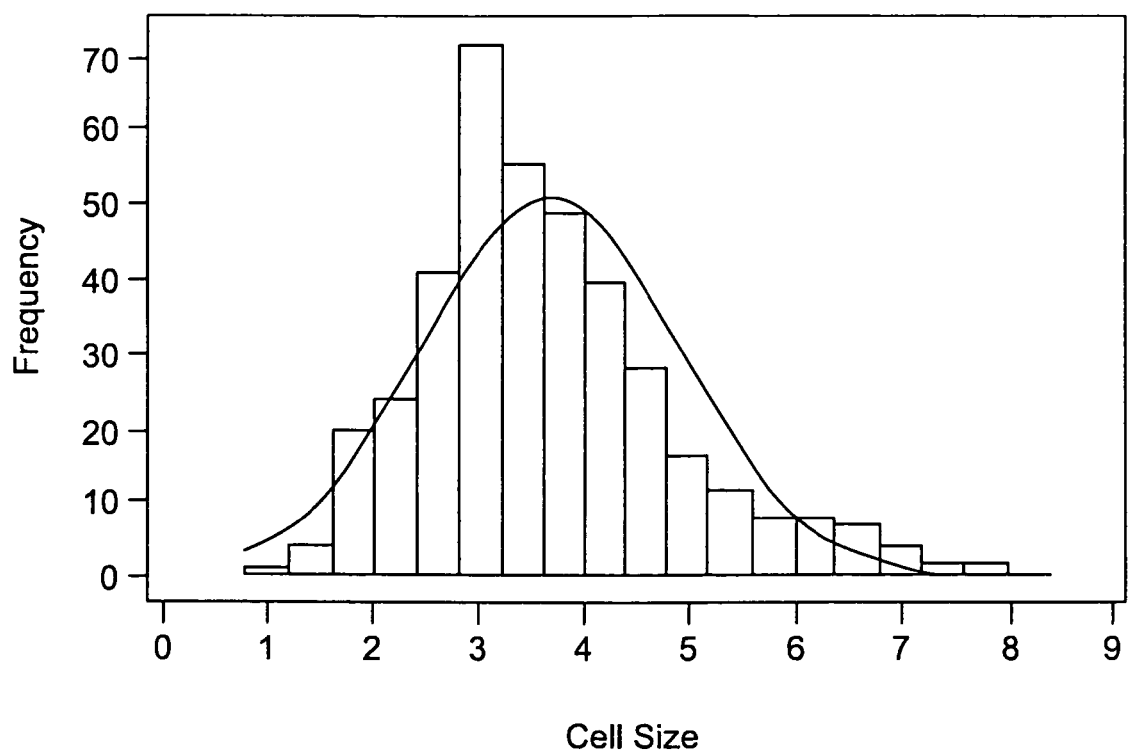
FIG. 1 represents a frequency distribution plot of cell size versus frequency to illustrate the definition of the term "average pore size"

As defined herein, the term "average pore size" as applied to a polymer foam denotes the diameter of the foam cells, which is generally represented as a frequency/cell size distribution plot. An example of this type of distribution is shown in FIG. 1. The distribution is characterized by an average pore size and a standard deviation.

The properties of foam or composite materials with weight or density reduction are known to follow iso-strain or iso-stress behavior, and usually lie between the so-called "classical upper bound" and "classical lower bound," respectively.

Figure 2:
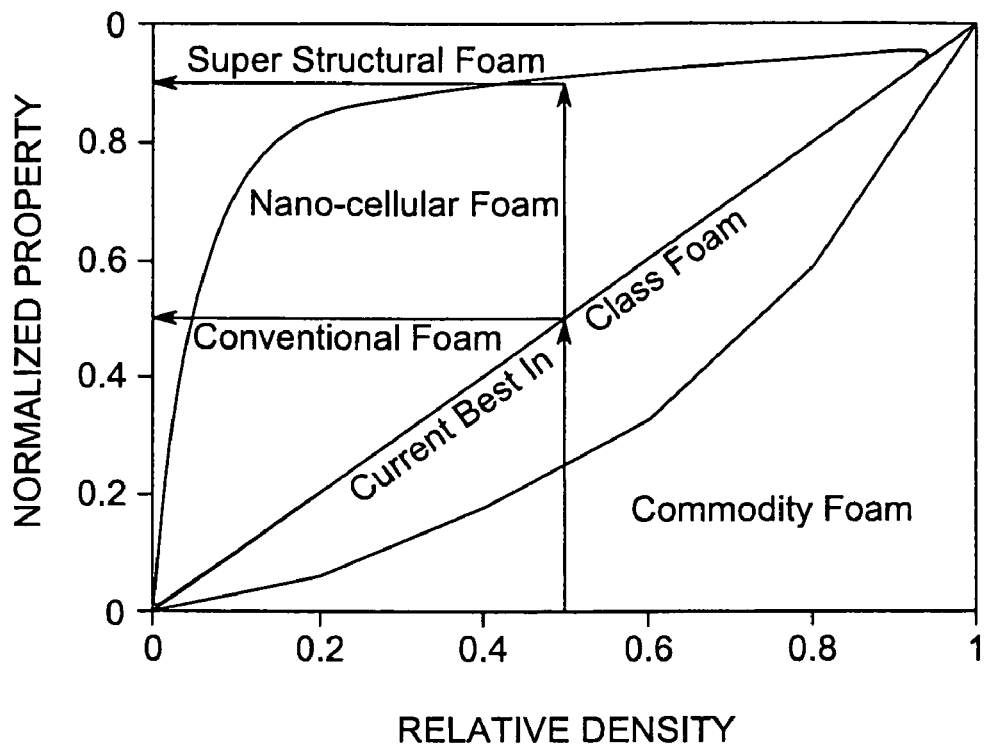
FIG. 2 is a plot of relative density versus normalized properties for various types of polymer foams, including nano-cellular foams disclosed herein.

FIG. 2 shows a schematic representation of the classical upper bound and lower bound.

Commonly available polymer foams or conventional foams (usually made of commodity polymers) have macro-sized pores, that is an average pore size of greater than 10 microns. Such foams, referred to as "commodity foam" in FIG. 2, generally have properties that lie scattered below the predicted lower bound value. The deviation is primarily due to wide scatter in the pore sizes present in the foam, that is, the ratio of the maximum pore size to the minimum pore size is greater than or equal to about 3 times the standard deviation. For a micro-cellular foam, herein explained as a foam having a pore size from about 1 micron to 10 microns and a lower pore size scatter, that is less than or equal to about one time the standard deviation, the properties generally lie between the upper bound and the lower bound (See FIG. 2). However, if the average pore size of a foam can be engineered to be less than about a micron so as to approach the so-called "defect insensitive pore size", and the pore size scatter is less than or equal to about one time the standard deviation, then the properties of the foam can equal or even exceed the values determined by the upper bound (FIG. 2). Such a foam is termed herein as a "super-structural foam". For the purposes of this disclosure, a super-structural foam is defined as a foam that has a property that is equal or higher than the bulk property exhibited by the material of which the foam is made, and has a relative density that is from about 1 percent to about 50 percent of the bulk density of the material of which the foam is made.

Mathematically, the defect insensitive pore size, hereinafter abbreviated as "DIPS" for a material is given by Equation (1):

$$DIPS = \frac{\gamma E}{\sigma_{th}^2} \quad \text{(Equation 1)}$$

where "$\gamma$" is the surface energy, "E" is the modulus, and "$\sigma_{th}$" is the theoretical strength of the material. As defined herein, the term "theoretical strength" as applied to a polymer is defined as the calculated strength of the polymer molecule based on the bond energies of all the bonds present in the polymer. For example, the theoretical strength of a sample of polyethylene having a given number of repeat units and a given molecular weight is given by the sum of the bond energies of all the C—H and C—C bonds present in the polyethylene sample. Table 1 shows some examples of the DIPS values calculated using Equation 1 and typical values for "$\gamma$" and "E". These values are sufficiently high to cover any type of a polymer. Thus, polymers such as polycarbonates, polyetherimides, or polyimides may be considered for these calculations.

TABLE 1

| Surface Energy (J m$^{-2}$) | Bulk Modulus (×10$^9$ Nm$^{-2}$) | Theoretical polymer chain strength (×10$^9$ Nm$^{-2}$) | DIPS (nanometers) |
|---|---|---|---|
| 40 | 5 | 1.6 | 78 |
| 35 | 2.4 | 1.6 | 33 |
| 20 | 5 | 6 | 278 |
| 40 | 2.4 | 5.5 | 317 |
| 35 | 2.4 | 2.5 | 1344 |
| 20 | 2.4 | 1.6 | 19 |
| 40 | 1 | 1.6 | 156 |

Figure 3:
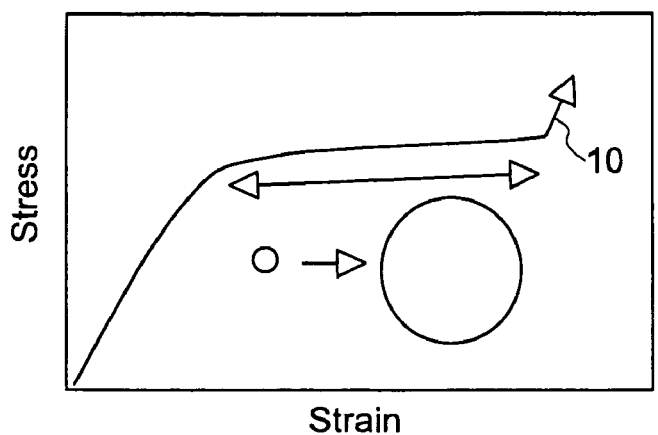
FIG. 3 is a schematic representation showing the variation of stress versus applied strain during the formation of a polymer foam, in accordance with an embodiment of the invention.

The known relationship between stress concentration (SC), surface modulus, and pore size for metals may be considered as a basis for invoking the possibility of defect-insensitive structures for polymer foams. When a polymer is foamed, the initially formed bubble expands. During the expansion, the stress remains constant with increasing strain. However, at a certain point, (shown in FIG. 3), the skin of the polymer bubble may undergo stretching at constant strain, indicated by reference numeral 10, as a result of which stress stiffening may occur. Stress stiffening may occur as a result of molecular orientation. In general, it may be said that for a given bubble size, a stretched skin may give more stiffness due to the molecular orientation. Thus in an embodiment, the nano-cellular polymer foams have an average pore size which comprises a defect insensitive pore size.

Such polymer foams may possess super-structural properties. It may be calculated that a similar reduction in SC can be achieved when the average pore size is about 100 nanometers, thus leading to a super-structural foam. FIG. 2 schematically illustrates a representative, desirable property-relative density space for a super-structural foam.

Two parameters may play a significant role in the improved properties of the nano-cellular polymer foams: (a) inter-particle distance, and b) surface forces. This understanding may enable the engineering of a foam morphology characterized by parameters such as average pore size and pore size distribution for the desired end-use application. The methodology can be used for predicting the structure-property relationship of foams made of any natural or synthetic material, such as for example, end grain balsa wood, poly(vinyl chloride), polystyrene, polyimide, polyetherimide, polyurethane, and epoxy resins. Poly(vinyl chloride) and polystyrene foams can be regarded as low temperature foams. Polyetherimide foams may be regarded as suitable materials for high temperature applications. Epoxy and polyurethane foams may be thermoset-based foams.

The structure-property relationship of Equation (1) may be applicable to mechanical properties. Other structure-property relationships may also be derived, particularly for those properties that are of commercial interest. Examples of properties that are of commercial interest include super thermal insulation (hereinafter referred to as "super insulation"), optical properties, such as transparency; acoustic, dielectric, magnetic and electrical properties, and energy absorption properties such as vibration damping, damage tolerance, and transport properties. Two of these properties—super insulation and optical properties are discussed below to illustrate the concepts.

Figure 4:
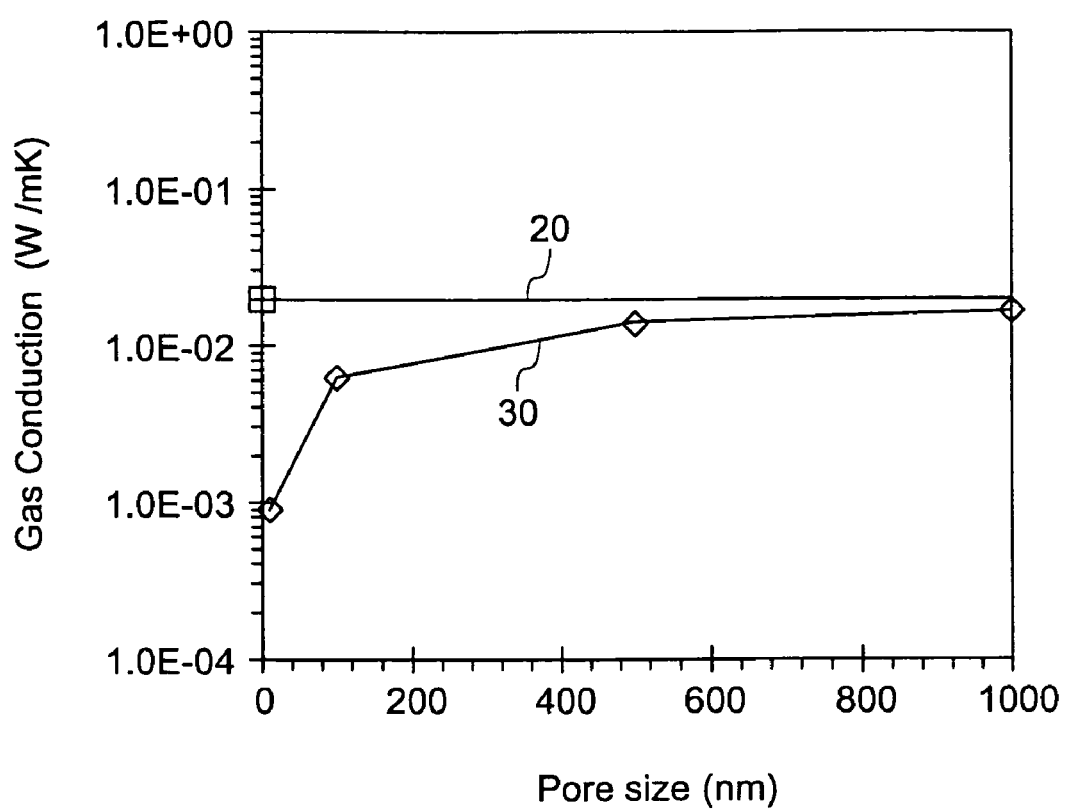
FIG. 4 is a plot showing the variation of gas conduction as a function of the pore size for a polymer foam in accordance with another embodiment of the invention.

The thermal conduction of a polymer foam ($k_{foam}$) is given by Equation 2:

$$k_{foam} = k_{polymer} + k_{gas} + k_{convection} + k_{radiation} \quad \text{(Equation 2)}$$

wherein $k_{polymer}$, is the conduction by the polymer, $k_{gas}$ is the conduction by the gas present in the foam, $k_{convection}$ is the conduction due to convection currents of the gas present in the foam, and $k_{radiation}$ is the conduction of thermal energy by the gas in the foam by radiation. For a polymer foam, the dominant mode of thermal conduction is gas conduction (i.e., $k_{gas}$), which accounts for about 75 percent of $k_{foam}$. Generally, $k_{radiation}$ accounts for about 20 percent of $k_{foam}$. The $k_{gas}$, and $k_{radiation}$ are given by equations (3) and (4) respectively:

$$k_{gas} = V_f \frac{k_{gas0}}{1 + C\frac{T}{d \cdot P}} \quad \text{Equation (3)}$$

$$k_{radiation} = \frac{16\sigma T^3}{3E} \quad \text{Equation (4)}$$

where $V_f$ is the porosity-volume fraction of pores, T is the temperature, $k_{gas0}$ is the thermal conductivity of free air, C is a constant, d is the pore diameter, P is the pressure, $\sigma$ is the Stefan-Boltzmann constant, and E is the extinction coefficient. A plot of pore size versus $k_{gas}$ is shown in FIG. 4, which is discussed in some more detail in the Examples Section. It may be evident from FIG. 4 that as the average pore size of the polymer foam falls from about 1000 nanometers to about 200 nanometers, the gas conduction drops by about an order of magnitude—from about $1 \times 10^{-2}$ watt meter$^{-1}$Kelvin$^{-1}$ to about $1 \times 10^{-3}$ watt meter$^{-1}$Kelvin$^{-1}$. When the average pore size drops below 200 nanometers, conduction of thermal energy by convection may begin to drop sharply below $2 \times 10^{-2}$ watt meter$^{-1}$Kelvin$^{-1}$. Thus, in the nano-cellular polymer foams disclosed herein, the gas conduction mode may be greatly reduced or virtually eliminated, thereby leading to a foam that can be considered to be a super-insulating foam. Air is a very good thermal insulator. The thermal insulation capacity in polymeric foam is lost due to convective heat transfer under temperature gradient. Thermal conduction occurs by collision and energy transfer between gas molecules, the collision frequency being determined, inter alia, by the mean free path of the gas molecules. However, if the size of the pore containing the gas molecules is reduced progressively such that it is comparable to or less than the mean free path of the gas molecules, thermal conduction by the gas conduction mode can be greatly reduced or virtually eliminated. This is known as Knudsen Effect. For example, if the conducting gas is air, which has a mean free path of about 0.60-100 nanometers depending upon the temperature, it follows that a nano-cellular foam having an average pore size of less than about 60-100 nanometers or equal to about 60-100 nanometers will have a greatly reduced or virtually zero air conducting capability. In general, therefore, for achieving very low or virtually zero gas conduction of a particular type of gas having a characteristic mean free path, one can design a nano-cellular foam having an average pore size that is comparable to or less than the mean free path of the gas molecules. Gas conduction begins to drop off exponentially at around an average pore size of 200 nanometers. In an embodiment, nano-cellular foams are disclosed, which have an average pore size of about 25-200 nanometers in an embodiment, and an average pore size of about 50-100 nanometers in another embodiment. Such nano-cellular foams having very low gas conduction of less than or equal to about $2 \times 10^{-2}$ watts meter$^{-1}$ kelvin$^{-1}$ may be regarded as super-insulating foams. Referring to equation (2), it may be seen that as $k_{gas}$ is made to approach zero by engineering the pore size, the overall thermal conduction of the polymer foam ($k_{foam}$) approaches a limiting value that is decided by the other components, $k_{polymer}$, $k_{convection}$, and $k_{radiation}$. In an embodiment, the super-insulation foams disclosed herein have a thermal conduction ($k_{foam}$) in a range from about 0.001 to about 0.01 watts meter$^{-1}$ kelvin$^{-1}$ over a temperature range from about ambient temperature to about 350° C., respectively.

The optical properties of a polymer that is transparent to incident radiation are mainly a consequence of the electronic and molecular structures of the polymer. Some of the optical properties can be improved by engineering the surface structures. For example, when solar radiation is incident on a polycarbonate sheet at normal incidence, around 88 percent of the incident light is transmitted with the remaining 12 percent being reflected. The reflection is believed to be due to a refractive index mismatch at the polymer/air interface. However, by engineering surface structures on the sheet using nanometer-sized structures, transmission of radiation can be increased to nearly 100 percent. The enhancement of transmission due to the nanometer-sized structures may result from phenomena such as diffractive optics to generate a graded refractive index regime at the polymer/air interface, or self-interference using zeroeth order gratings. Similarly, nanometer-sized pores when introduced in a polymer foam may aid in increased transparency and increased transmission of radiation, such as solar radiation. The scattering of radiation by pores may be understood, for example, by applying Rayleigh-Gans-Debye (abbreviated as "RGD") theory, which explains molecular scattering in polymers as a function of the pore size and the wavelength of the incident radiation.

The nano-cellular polymer foams disclosed herein can possess transparency to radiation. Any radiation falling within the electromagnetic spectrum may be considered. A specific example of radiation is the visible light portion of the electromagnetic spectrum. For example, nano-cellular polymer foams transparent to visible light may be considered. In some cases, the foams can possess super-insulation properties and transparency to radiation. It is known that when a pore having a size in the order of micrometers is introduced in a foam made of a polymer that is transparent in its bulk state, a bisphenol A polycarbonate homopolymer for example, the pore may become opaque. The opacity is generally believed to be due to scattering of light by the pore. The practical consequences of increasing the transmission of radiation, such as solar radiation are significant. For example, it is estimated that an increase in solar radiation transmission of one percent can increase the yield of a green house having a transparent polymer roof glazing by around one percent. Using the theoretical understanding described above, pore size can be engineered based upon an understanding of its relationship with the wavelength of the radiation incident on the pore. Radiation scattering may be minimized by engineering an average pore size that approaches the wavelength of the incident radiation. For example, for visible light, the average pore size in a polymer nano-cellular foam to minimize scattering may be about 550 nanometers. In another embodiment, the average pore size to minimize scattering visible light or selected wavelengths therein may be in a range from about 350 nanometers to about 800 nanometers.

Figure 5:
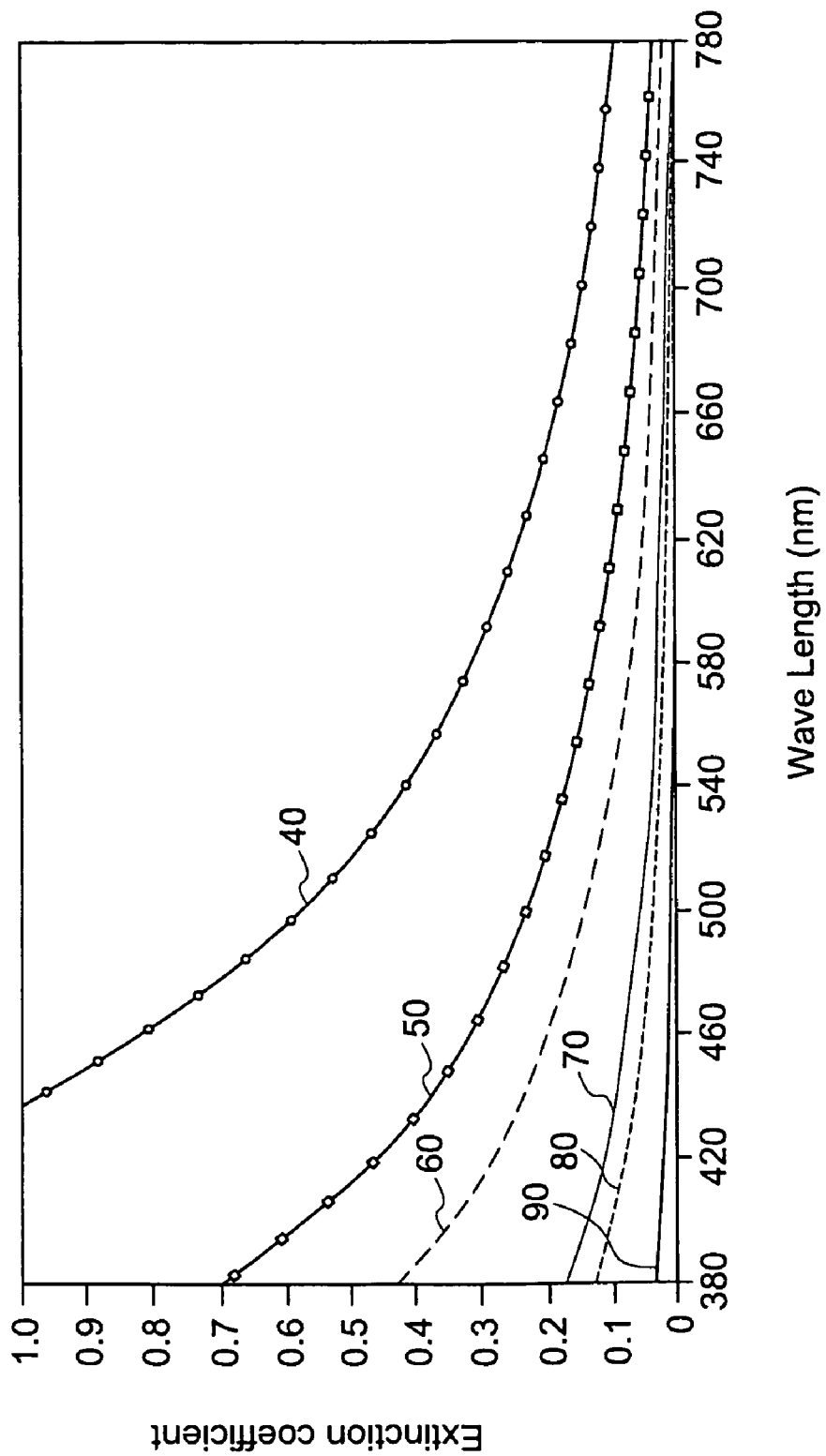
FIG. 5 represents graphical relationships between the extinction coefficient and the wavelength for a polymer foam having a given pore diameter/foam density set of values, in accordance with still another embodiment of the invention.

Optical properties in a polymer foam may be predicted by using Bouguer's Law, shown in Equation (5):

$$T = e^{-\alpha t} \quad \text{(Equation 5)}$$

which states that light transmission (T) is an exponential function of extinction coefficient ($\alpha$) and path length of the non-scattered light (t), which is roughly equal to the thickness of the medium through which the light travels. The extinction coefficient ($\alpha$) is shown in Equation (6):

$$\alpha = 32\pi^4 \frac{\rho_{Foam}}{\rho_{Solid}} \frac{a^3}{\lambda^4} \left(\frac{n^2-1}{n^2+2}\right)^2 \qquad \text{Equation (6)}$$

where "a" is the pore size in the foam, "λ" is the wavelength of the incident radiation, "n" is the refractive index of the medium, $\rho_{Foam}$ is the density of the polymer foam, and $\rho_{Solid}$ is the density of the solid polymer of which the foam is made. For the purposes of this disclosure, the term "pore size" is also sometimes referred to as pore diameter by approximating the pore cross-section to have a circular shape. FIG. 5 shows plots having reference numerals 40-90, which illustrates the relationship between the extinction coefficient and the wavelength for a given pore diameter/foam density set of values, shown as Examples 2-7 in Table 2 in the Examples Section further below. Polymer foam density is given in units of kilograms per cubic meter. These relationships are discussed in more detail in the Examples Section.

Figure 6:
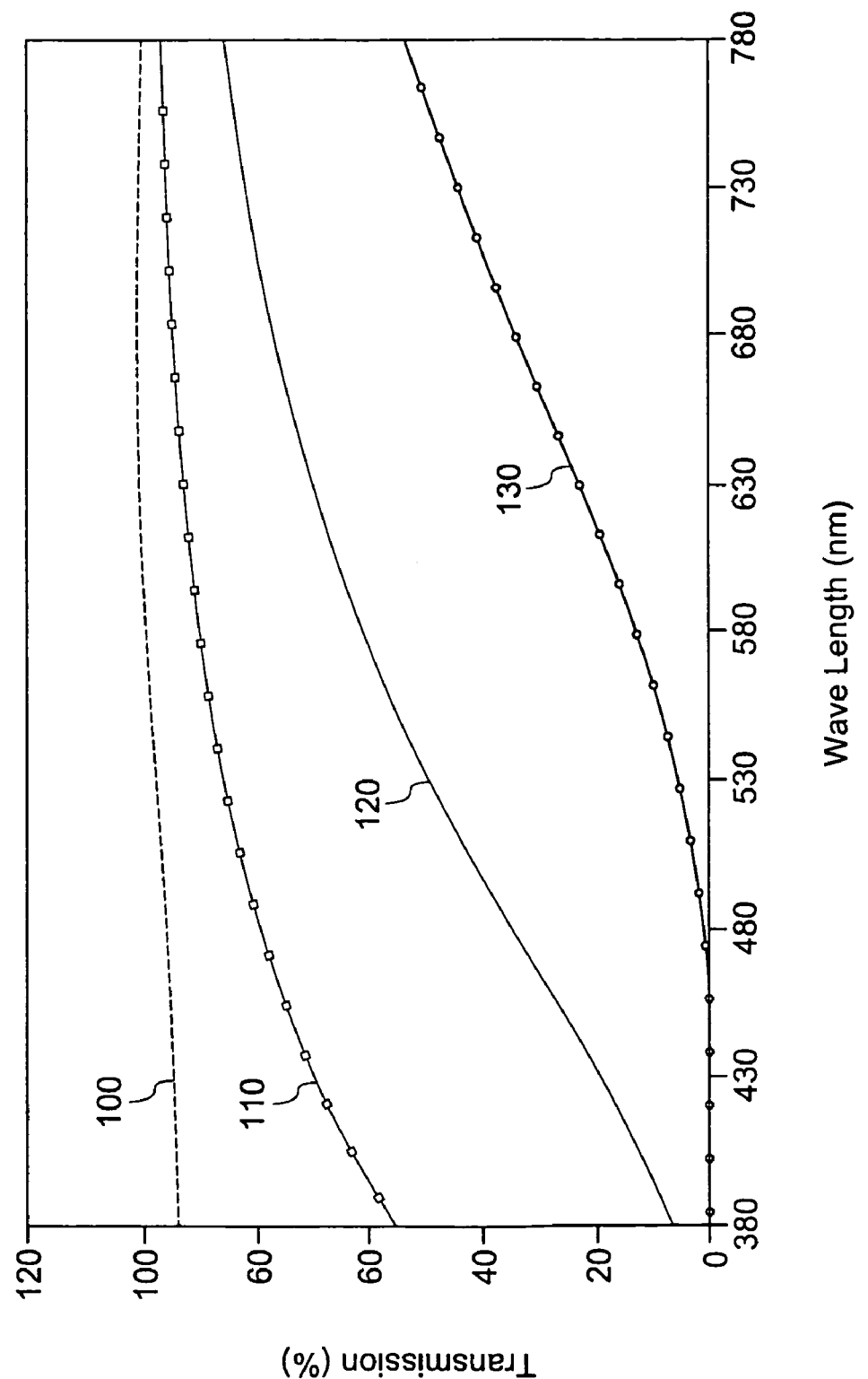
FIG. 6 represents a plot illustrating the effect of average pore size and foam density on optical transparency to visible light of a bisphenol A (BPA) homopolycarbonate foam, in accordance with still yet another embodiment of the invention.

FIG. 6 graphically shows the results of simulation calculations of the effect of average pore size and foam density on optical transparency to visible light (that is, 380 nanometers to 780 nanometers) of a bisphenol A (BPA) homopolycarbonate foam having a density of 240 kilograms per cubic meter. The details of the plots, indicated by reference numerals 100-130, are shown in Table 3, and discussed in greater detail in the Examples Section. The plots show that with decreasing pore size for a given foam density and wavelength, the percent light transmission increases.

Foaming of a polymer may occur as a result of the phase separation kinetics of the foaming process. The mechanism of phase separation may occur by nucleation and growth, by spinodal decomposition, or combinations thereof. The extent of these mechanisms may depend upon the phase diagram of the system. In solid-state foaming, the foaming agent gas molecules diffuse into the polymer at very high saturation pressures to form a single phase (also sometimes referred to as the "homogeneous phase") of "gas-polymer". Pressure/temperature quench in the "gas-polymer" then leads to an instability in the system and gas molecules separate themselves from the polymer, which results in nucleation and growth of gas bubbles. The nucleation depends, inter alia, upon the number of gas molecules inside the polymer, the magnitude of the pressure drop, and the foaming temperature, that is the temperature at which foaming is carried out. The nuclei grow because of the concentration gradient of gas molecules present in the polymer matrix and at the surface of the bubble. Further, the pressure inside the nucleated bubble pushes the polymer matrix against viscoelastic forces and the surface energy of the polymer, which assists in the growth of the bubbles. After some time, the concentration gradient of gas and pressure inside the bubble fall down to a value such that is not sufficient to drive the growth.

The growth model may be studied theoretically by using certain assumptions, such as: (i) the bubble is spherical; (ii) the gas inside the bubble follows ideal gas law; (iii) the gas concentration in the bubble varies only with the radial position and time; (iv) the gas pressure in the bubble is related to the dissolved gas concentration at the bubble surface by Henry's Law; (v) the growth process is isothermal; and (vi) the polymer material's properties are independent of the concentration of the dissolved gas. Using these assumptions, equations of (a) motion, (b) integral mass balance over the bubble, and (c) differential mass balance in the surrounding mother phase during the foaming process can then be set up and solved to understand various relationships, such as for example, effect of time on foam cell diameter for a given saturation pressure, effect of pressure and temperature on foam cell diameter, and effect of saturation pressure on foam cell diameter. As disclosed herein, by the term "foam cell diameter" is meant the cross-section size of the pore in the foam assuming that the pore is circular.

The results from the calculations based on the growth mechanism show that maximum cell density, which is defined herein as the number of cells per unit volume of the polymer foam; and minimum cell size can be achieved by putting the maximum possible amount of gas inside the polymer. This maximizes the number of potential nucleation sites, which in turn results in higher nucleation density. The cell size can be reduced by suitably varying parameters, such as for example, concentration of the foaming agent, pressure, nucleation density, foaming temperature, and the viscoelastic response of the polymer.

The nano-cellular polymer foams described herein can be made by a process that in an embodiment comprises contacting a polymer with a foaming agent, the polymer having an average particle size from about 10 nanometers to about 10 millimeters. The process can be implemented in an extruder. A suitable extrusion technique can be used to produce the nano-cellular polymer foam. In the present disclosure, nano-cellular polymer foams may be prepared without using high pressures generally used in the art. This may be achieved by using a low temperature to saturate the polymer particles with the foaming agent. During the contacting step, the foaming agent gas molecules diffuse into the polymer to form a single phase (also sometimes referred to as the "homogeneous phase", described previously. The extrusion technique may be performed at a low temperature, such as below ambient temperature.

As disclosed herein, the term "average particle size" as applied to the polymer feed used for making the nano-cellular foam refers to volume average particle size. A particulate form of the polymer comprising particles, fibers, short fibers, platelets, granules, or combinations thereof may be considered. When fibers are considered, the average particle size refers to the cross-sectional thickness of the fibers.

Figure 7:
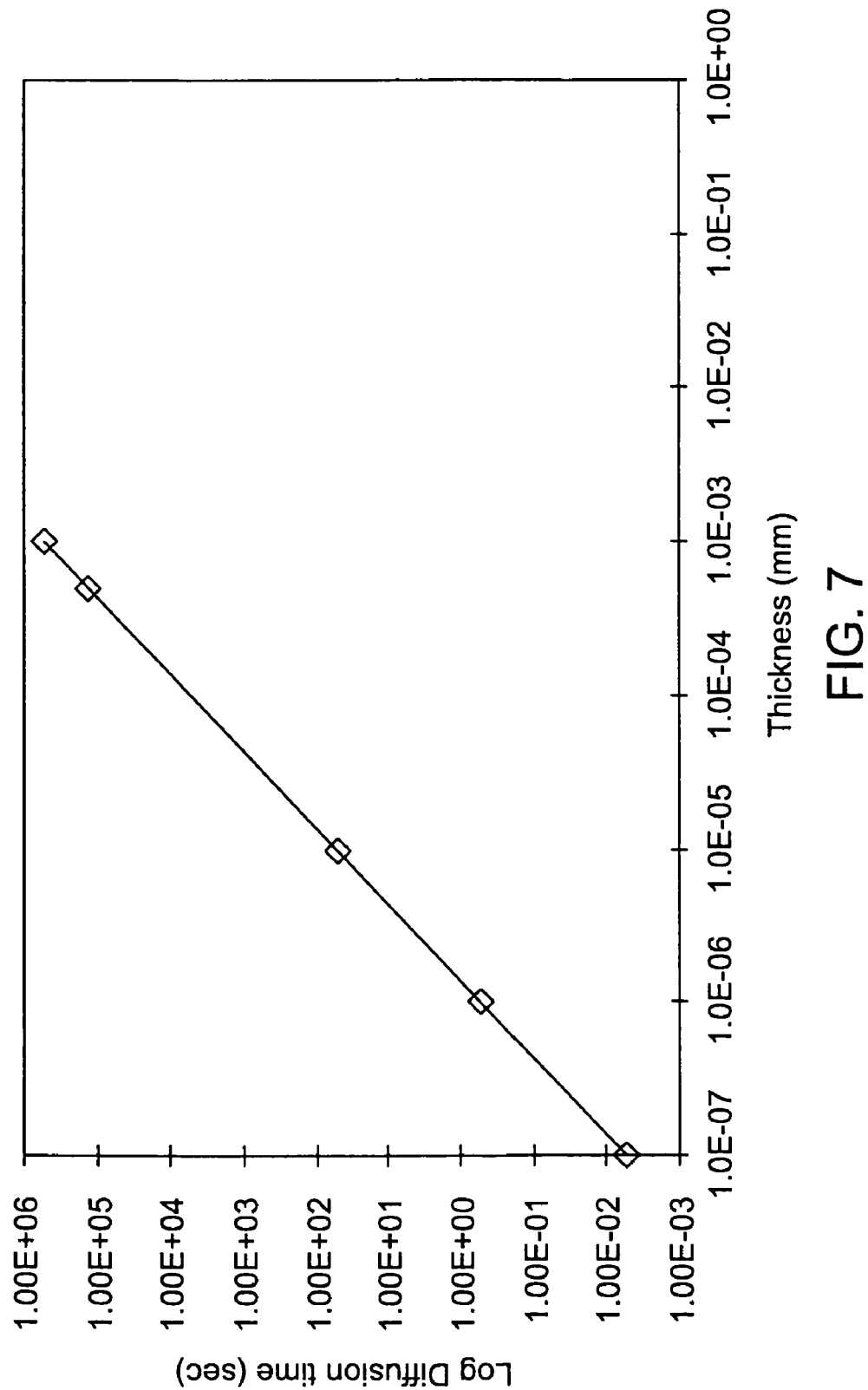
FIG. 7 is a graphical plot showing the relationship between the average particle size and the logarithm of the diffusion time for polymer particles, in accordance with another embodiment of the invention.

As described previously, the diffusion of the foaming agent gas molecules into the polymer particles leads to formation of the "homogeneous phase", wherein the gas is present inside the particle under a high saturation pressure. For nucleation to take place, it is desirable that the gas molecules present inside the polymer particles remain so for a certain period of time so as to enable the nucleation process for foam formation. Therefore, it becomes important to understand the diffusion of the foaming agent gas molecules out of the polymer particles in the "homogeneous phase". This diffusion process may or may not follow Fick's Second Law, which when approximated to one dimension assumes the relationship shown in Equation (7), $$\frac{\partial C}{\partial t} = D \frac{\partial^2 C}{\partial x^2} \qquad \text{Equation (7)}$$

where "C" is the concentration of the foaming agent, "D" is the diffusion coefficient, "t" is the diffusion time, and "x" is the thickness of the particle. Solving Equation (7) for "t" leads to the relationship shown in Equation (8), $$t \approx \frac{x^2}{4D} \qquad \text{Equation (8)}$$

which indicates that the diffusion time, that is time taken for the foaming gas molecules to diffuse out of or into the polymer particles is a function of the square of the thickness of the polymer particles divided by the diffusion coefficient. A plot of thickness versus diffusion time is shown in FIG. 7, which shows that as the thickness (or the average particle size) in millimeters of the polymer particles is reduced in a range from about 1 micron to about 100 nanometers, the log of diffusion time also decreases linearly. For example, the graph can be used to show that for a polymer particle size of about 1 millimeter, the log diffusion time calculated in accordance with Equation (8) is about 12 hours; and for a particle size of about 1 micron, the log diffusion time is about 0.5 second. The linear behavior predicted by this theoretical approach is generally applicable for a wide range of particle sizes in the range from about 10 nanometers to about 10 millimeters. In other embodiments, the particle size can be in a range from about 10 nanometers to about 100 microns; and from about 10 nanometers to about 1 millimeter. In an exemplary embodiment, a polymer having an average particle size of about 1 micron can be used to obtain a nano-cellular polymer foam having an average pore size of about 400 nanometers.

Figure 8:
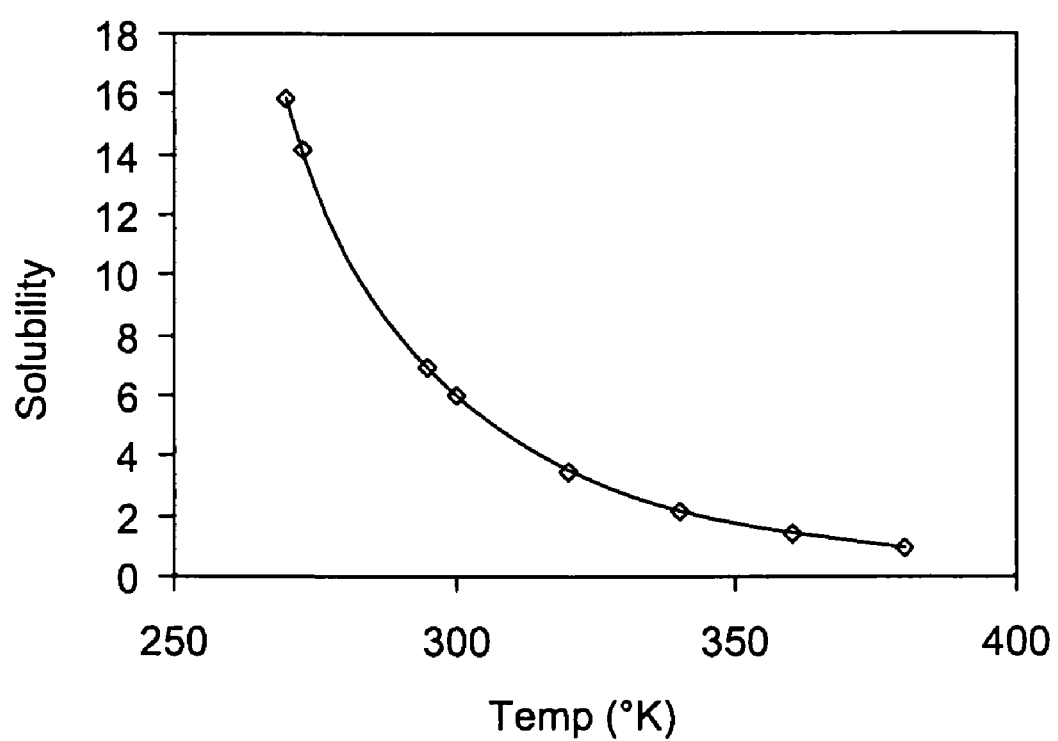
FIG. 8 represents a temperature-solubility plot for the polycarbonate of FIG. 6, in accordance with another embodiment of the invention.

Another significant parameter that affects the formation of the "homogeneous phase" is the solubility of the foaming agent gas in the polymer particles. The solubility of the foaming agent gas is given by Equation (9), $$S = S_0 e^{\frac{-\Delta H_s}{RT}} \qquad \text{Equation (9)}$$

where $\Delta H_s$ is the apparent heat of solution, S is the solubility at a given temperature "T", and $S_0$ is the solubility constant. When plotted graphically, Equation (9) leads to a curve such as that shown in FIG. 8 for solubility (expressed as weight/weight) of BPA polycarbonate in carbon dioxide foaming agent. The Figure shows that at a given pressure, when the temperature is reduced from ambient to zero degree Celsius, the solubility of the foaming agent gas in the polymer particles increases about three fold. In order to achieve foaming of a polymer, it is desirable to saturate the polymer particles with the foaming agent in as short a time as possible. Therefore, it follows from the foregoing explanation based on Equation (7) that by contacting the polymer particles with the foaming agent at a temperature that is as low as feasible, the polymer particles can be saturated in a much shorter time. In an embodiment, the contacting step is carried out at a temperature from about −100° C. to about 20° C. In another embodiment, the contacting step is carried out at a temperature from about −40° C. to about ambient temperature, and in still another embodiment, the contacting step is carried out at a temperature from about −40° C. to about 20° C. Higher temperatures, such as for example, the melting temperature of the polymer may also be used. This approach allows for practical ways of implementing techniques to produce nano-cellular polymer foams.

Operating pressure maintained during the contacting step is also a significant parameter. In an embodiment, the contacting step is implemented at a pressure from ambient pressure to about 150 newtons per millimeter square.

The solubility of the foaming agent in the polymer particles may be considered to be an adsorption process wherein the foaming agent molecules are adsorbed within the particle. Conversely, in desorption, the foaming agent molecules diffuse out of the polymer particles. The adsorption and desorption of a foaming agent such as carbon dioxide may be studied using a gravimetric method. In a representative procedure, a polymer sample, such as for example, a polycarbonate sample may be dried at 80° C. for at least four hours and then weighed. Then the sample may be placed in a pressure cell at a pre-determined temperature. The cell may be pressurized to a pre-determined pressure. Samples of the polymer may then be removed at various time intervals, and the weight gained due to carbon dioxide adsorption may be measured using an analytical balance having adequate sensitivity, example ±1 milligram. After the adsorption process is completed, the desorption of carbon dioxide from the polymer sample may be studied by following weight loss at selected time intervals.

It is evident from the foregoing discussion that practical approaches to forming nano-cellular polymer foams can be developed by using concepts such as (i) using a polymer feed having a particle size so as to lead to a foam having nanometer sized pores; (ii) saturating the polymer particles with the foaming agent at as low as a temperature as possible; and (iii) adjusting a total time taken for forming the "homogeneous phase" material from gas impregnated polymer particles and the time spent by the "homogeneous phase" material in a polymer processor (example, an extruder), such that the total time is less than the time taken for the foaming agent molecules to diffuse out of the polymer particles.

Figure 9:
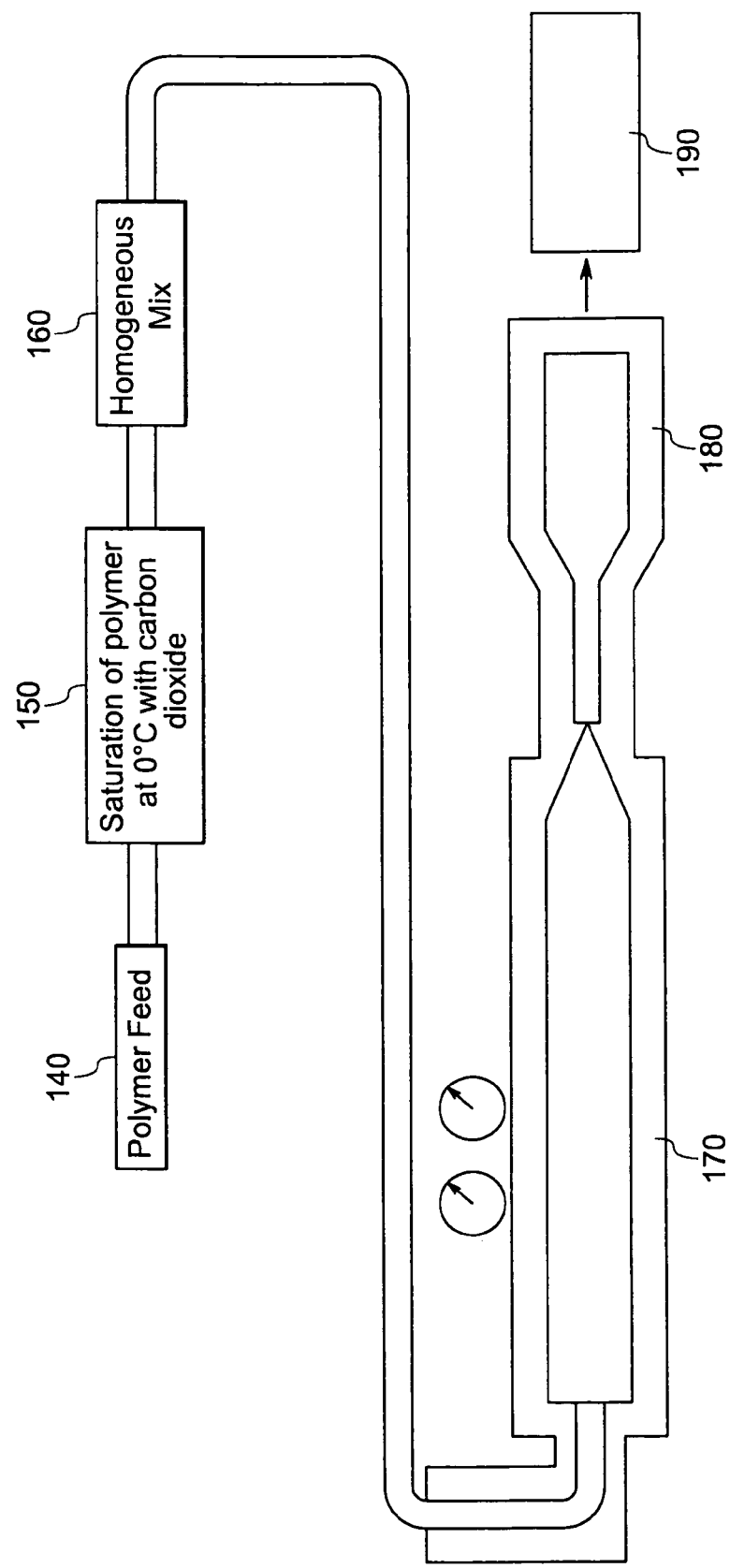
FIG. 9 represents a schematic process for forming a nano-cellular polymer foam, in accordance with one embodiment of the techniques disclosed herein.

In one embodiment of the process for producing a nano-cellular polymer foam article, depicted in FIG. 9, polymer feed 140 having a desirable particle size as described previously is taken and saturated with carbon dioxide gas at zero degrees Celsius (reference numeral 150), which leads to the formation of "homogeneous mix" (or "homogeneous phase") 160. Next, the "homogeneous mix" 160 is fed into extruder 170 comprising die 180 to produce the nano-cellular polymer foam article 190.

Figure 10:
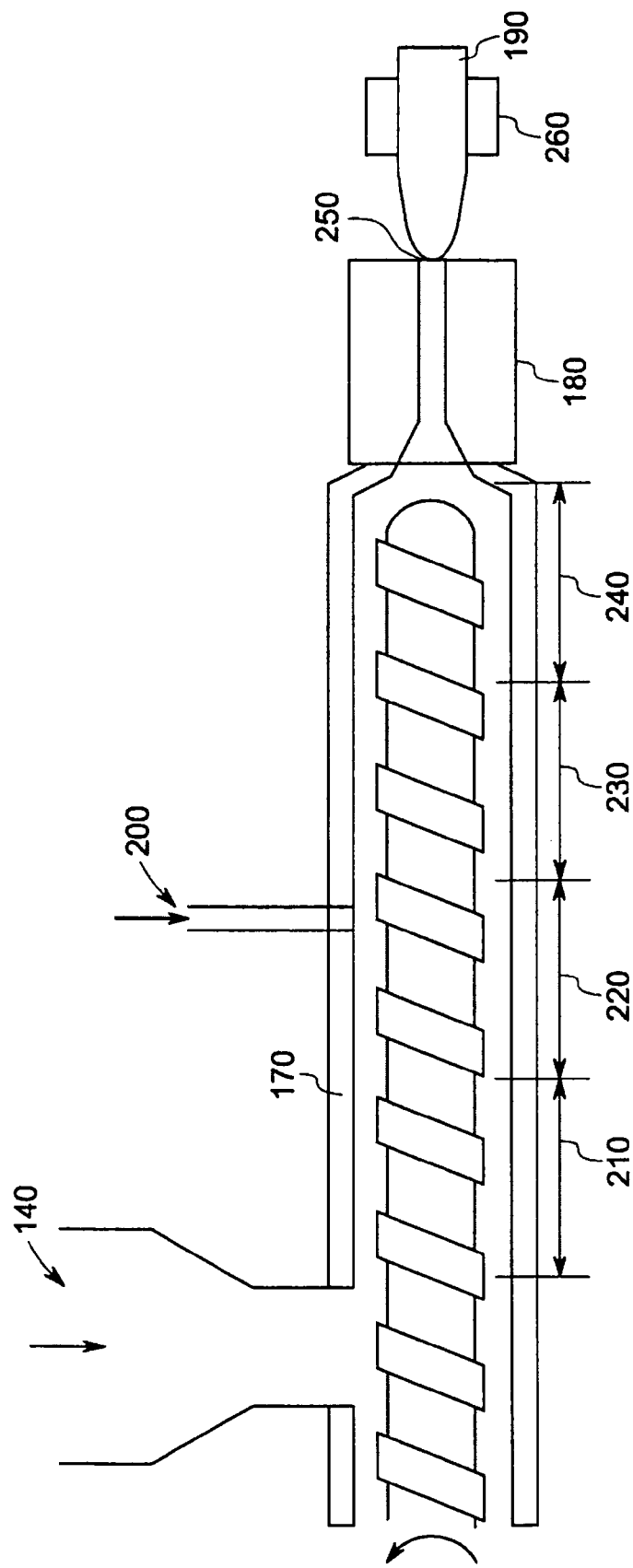
FIG. 10 represents a schematic process for forming a nano-cellular polymer foam, in accordance with another embodiment of the techniques disclosed herein.
Figure 11:
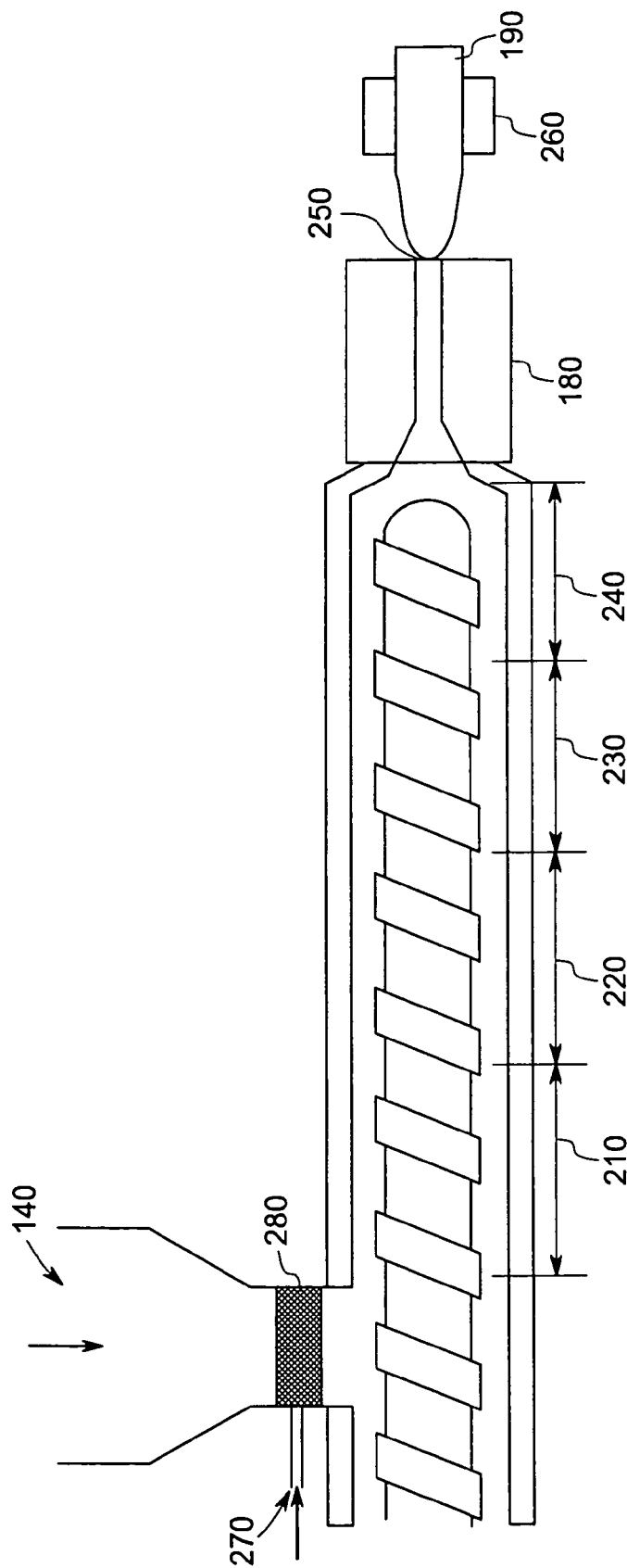
FIG. 11 represents a schematic process for forming a nano-cellular polymer foam, in accordance with yet another embodiment of the techniques disclosed herein.
Figure 12:
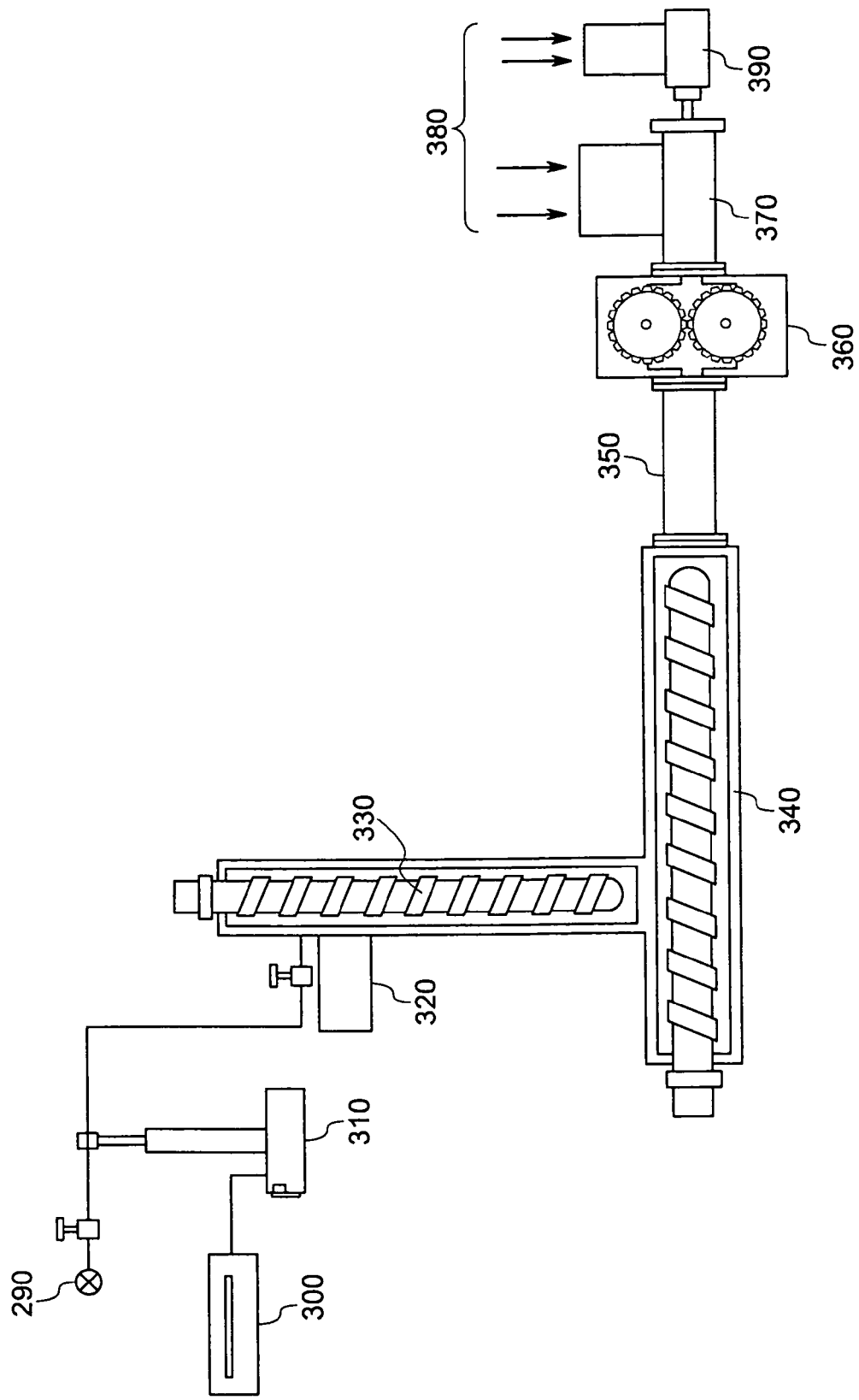
FIG. 12 represents a schematic process for forming a nano-cellular polymer foam, in accordance with still yet another embodiment of the techniques disclosed herein.

Other embodiments of the process are shown schematically in FIGS. 10-12. In FIG. 10, polymer feed 140 is fed into extruder 170. As the polymer feed traverses the length of the extruder, various zones are created. Thus, un-melted polymer in feed zone 210 melts to form melt zone 220, while the foaming agent comprising carbon dioxide gas and dry ice is introduced via inlet 200 into the barrel of the extruder. The foaming gas mixes with the melting polymer feed in mixing zone 230, where adsorption of the carbon dioxide in the polymer particles may occur to give a "homogeneous phase" in single phase solution zone 240. The single phase solution then passes through die 180, and undergoes the foaming process, followed by being drawn by calibrator 260 to give nano-cellular polymer foam article 190. The process of nano-cellular foam formation may occur by nucleation, labeled as reference numeral 250 in FIG. 10.

In FIG. 11, polymer feed 140 is introduced into low temperature saturation system 280 comprising inlet 270 for admitting the foaming agent gas. The low temperature saturation system 280 is capable of saturating the polymer feed particles quickly (as explained previously) to form a gas-saturated polymer feed. This material then traverses through the length of the extruder—changing from feed zone 210 to melt zone 220, mixing zone 230, and homogeneous phase zone 240; then to die 180 to undergo foaming with 250 at the exit of the die, and finally being drawn by calibrator 260 to give the nano-cellular polymer foam article 190. It may be noted that in both embodiments shown in FIGS. 10 and 11, there is no need to maintain carbon dioxide back pressure. This simplifies the extruder design for producing the foamed articles.

In yet another embodiment of the technique, illustrated schematically in FIG. 12, low temperature extruder 330 is configured to receive polymer feed from pressure-fed hopper 320 and a foaming agent. The foaming agent is fed from supply 290 by positive displacement pump 310 regulated by pump controller 300. The low temperature extruder may assist in intimate contacting and/or mixing of the polymer and the foaming agent. The material from the low temperature extruder is then fed into second extruder 340 where the homogeneous phase material may be formed. Further mixing and saturation of the polymer feed by the foaming agent may be achieved, if desired, by use of mixer 350. The homogeneous phase material is then transported by use of gear pumps 360 to heat exchanger 370 where pressurized air 380 is admitted through inlets to partly cool the homogeneous phase material. The material is then extruded through filament die 390 to produce the desired nano-cellular polymer foam.

As mentioned previously, to produce nano-cellular polymer foam by an extrusion technique, it is desirable that the total time taken for forming the "homogeneous phase" material from gas impregnated polymer particles and the time spent by the "homogeneous phase" material in a polymer processor (example, an extruder), is less than the time taken for the foaming agent molecules to diffuse out of the polymer particles. For the purposes of this disclosure, the total time may be regarded as a "residence time". In an embodiment, the residence time is from about 0.5 to about 0.9 times the time taken for diffusion of foaming agent out of the polymer particles.

The methods described above can be implemented in a batch, semi-batch, or a continuous manner. Continuous methods are desirable since they may allow for better process control and production of nano-cellular polymer foams having a relatively more uniform and higher quality, such as for example, a narrow pore size distribution having an average pore size of less than or equal to about one time the standard deviation.

As disclosed herein, the term "foaming agent" is defined as a chemical agent that is used to foam a polymer. The foaming agent may be a solid, a liquid, or a supercritical foaming agent. A foaming agent or a blowing agent is used to form the polymer foam. Blowing/foaming agents that may be used include inorganic agents, organic agents and other chemical agents. Suitable inorganic blowing agents include carbon dioxide, nitrogen, argon, water, air, nitrogen, and inert gases such as helium and argon. Organic agents include aliphatic hydrocarbons having 1-9 carbon atoms, aliphatic alcohols having 1-3 carbon atoms, and fully and partially halogenated aliphatic hydrocarbons having 1-4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane, and the like. Partially halogenated chlorocarbons and chlorofluorocarbons include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123), 1-chloro-1,2,2,2-tetrafluoroethane (HCFC-124), and the like. Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Other chemical agents include azodicarbonamide, azodiisobutyronitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, trihydrazino triazine, and the like.

In an embodiment, the foaming agent may be selected from the group consisting of carbon dioxide, air, nitrogen, argon, gaseous hydrocarbons, and combinations thereof. The foaming agent may be selected from the group consisting of solid carbon dioxide, liquid carbon dioxide, gaseous carbon dioxide, or supercritical carbon dioxide. Any of the inert gases, such as for example, helium, xenon, and argon may be used. Non-limiting examples of gaseous hydrocarbons include methane, ethane, propane, and butane. In another embodiment, halohydrocarbons that would be expected to be in a gaseous form at ambient temperature and pressure may be used. Examples of such halohydrocarbons include fluorohydrocarbons, fluorocarbons, chlorocarbons, and chlorofluorocarbons.

The techniques known to implement solid state foaming may be applied to continuous foaming processes, such as those described herein, for producing nano-cellular polymer foam. The polymer may be in a flowing state in the extruder, but the learning acquired from the modeling of the physics of the foaming process, described hereinabove, can be used to control the nucleation density and cell size distribution and form nano-cellular polymer foam. For example, a combination of physical blowing agent, a surface tension modifier, application of a pulsating pressure, and a temperature quench step may be used to potentially increase cell density to about a billion cells per cubic centimeter in the resulting nano-cellular polymer foam. In an embodiment, the extruder screw and the die can be designed in such a way so as to maximize the pressure drop in the extruder. Alternative ways of saturating the polymer feed with as high an amount of the foaming agent (example, carbon dioxide) may also be used to maximize cell density in the resulting nano-cellular foam.

Any plastic may be used as the polymer feed for making the nano-cellular polymer foam and articles therefrom. In an embodiment, the polymer comprises a thermoplastic polymer. In another embodiment, the polymer comprises an amorphous polymer. In still another embodiment, the polymer comprises a semi-crystalline polymer. Thermoset polymers may also be used. Mixtures of two or more of the foregoing types of polymers may also be used.

Thermoplastic polymers that may be used are oligomers, polymers, ionomers, dendrimers, copolymers such as block copolymers, graft copolymers, star block copolymers, random copolymers, or the like, or combinations comprising at least one of the foregoing polymers. Suitable examples of thermoplastic polymers include polyacetals, polyacrylics, polycarbonates polystyrenes, polyesters, polyamides, polyamideimides, polyarylates, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, or the like, or combinations comprising at least one of the foregoing thermoplastic polymers. In an embodiment, the thermoplastic polymer comprises an acrylic resin, a polycarbonate, a polyolefin, a polyester, or a polyvinyl chloride. In another embodiment, the thermoplastic polymer comprises a polyetherimide or a polycarbonate. Polyetherimides and polycarbonates can be prepared by methods known in the art. Polycarbonates are particularly useful since they have high toughness, excellent transparency, and good moldability. In a particular embodiment, polycarbonates prepared from bisphenol A, either as a monomer or a comonomer are useful polymers for producing nano-cellular foams and foamed articles due to their good optical transparency, good mechanical properties, good impact properties. Thus, a polycarbonate nano-cellular foamed article having tough impact strength, super-insulation, and optical transparency can be produced using the techniques described herein. The polycarbonate resin for use is generally obtained from a dihydric phenol and a carbonate precursor by an interfacial polycondensation method or a melt polymerization method. Typical examples of the dihydric phenol include those disclosed in U.S. Patent Application No. 20030207082A1, which was published on Nov. 6, 2003, which is incorporated by reference herein in its entirety. In a particular embodiment, polycarbonates produced from 2,2-bis(4-hydroxyphenyl)alkanes and/or bisphenol A are useful for producing the nano-cellular foams and foamed articles disclosed herein.

Non-limiting examples of semi-crystalline thermoplastic polymers include polybutylene terephthalate, polyphenylene sulfides, polyetheretherketones (PEEK), polyetherketones (PEK), phthalamides (PPA), polyetherketoneketones (PEKK), and high temperature nylons.

Blends of thermoplastic polymers may also be used. Examples of blends of thermoplastic polymers include those materials disclosed in U.S. Patent Application No. 20050112331A1, which was published on May 26, 2005, which is incorporated by reference herein in its entirety.

The thermoplastic polymers used herein may also contain thermosetting polymers if desired. Examples of thermosetting polymers are polyurethanes, natural rubber, synthetic rubber, epoxy, phenolic, polyesters, polyamides, polyimides, silicones, and the like, and mixtures comprising any one of the foregoing thermosetting polymers.

The polymer feed material for processing into nano-cellular foams may also comprise one or more fire-retardant agents admixed therewith. Any of the fire-retardants known in the art may be used. Other additives such as antioxidants, anti-drip agents, anti-ozonants, thermal stabilizers, anti-corrosion additives, impact modifiers, ultra violet (UV) absorbers, mold release agents, fillers, anti-static agents, flow promoters, impact modifiers, pigments, dyes, and the like, such as, for example, disclosed in U.S. Patent Application No. 20050112331A1, published on May 26, 2005, which is incorporated by reference herein in its entirety, may also be added in the amounts desired. In an embodiment, fillers that can help in the foaming process and/or help improve the properties, such as for example, dielectric properties, mechanical properties, and the like may be added.

The thermoplastic polymers, blend of thermoplastic polymers or a blend of thermoplastic polymers with a thermosetting polymer is generally fed to the throat of the extruder along with any other desired additive(s). The additives may also be fed to the extruder in masterbatch form. The feed material may be produced by melt blending the polymer feed material and other desired additives and then forming in a single step using devices such as single and twin-screw extruders, Buss kneaders, roll mills, Waring blenders, Henschel mixers, helicones, Banbury mixers, or the like, or combinations of the at least one of the foregoing melt blending devices.

Besides being valuable for producing the nano-cellular polymer foams of interest disclosed herein, the methods described herein may generally be used advantageously for producing polymer foams and polymer foam articles having any desired foam density. For example, polymer foams having a foam density from about 1-95 percent of the bulk density of the polymer of which the foam is made of can be produced.

The nano-cellular polymer foams described herein may, in an embodiment, comprise a super-structural foam, where the super-structural properties are as described previously. In another embodiment, the super-structural foam may further comprise a super-insulating foam, where the super-insulation properties are as described previously. In other embodiments, the nano-cellular polymer foams have a foam density that is 1-10 percent; and 5-25 percent of the bulk density of the polymer material of which the nano-cellular polymer foam is made.

The polymer foams disclosed herein may have a high cell density that in an embodiment is greater than about $10^9$ cells per cubic centimeter, in another embodiment is about $10^{12}$ to about $10^{18}$ cells per cubic centimeter, and in still another embodiment is about $10^{15}$ to about $10^{18}$ cells per cubic centimeter. As disclosed herein, the term "cell" is defined as a void cavity that makes up the foam. The cells may comprise an "open cell structure", a "closed cell structure", or combinations thereof. An "open cell structure" is defined as a void cavity that is open at one or more sides. Open cell structures may connect to other open or closed cell structures. A "closed cell structure" is defined as a void cavity with no opening. A closed cell structure may or may not be present on the surface of a nano-cellular polymer foam. If present, the skin of the closed cell may form a part of the foam surface. In another embodiment, the polymer foams disclosed herein have an average pore size standard deviation that is less than or equal to about 10 percent of the average pore size. The term "average pore size" has been described previously herein.

The nano-cellular polymer foams produced as described herein are valuable for producing a variety of articles. When an extruder is used, nano-cellular polymer foam extrudates can be produced. In an embodiment, the nano-cellular foam can be used for producing foam sheets or foam panels, some examples of which include an integrated sandwich panel, a co-laminated panel, a co-extruded panel comprising an inner foam sheet, graded foam sheets, co-extruded foam sheets, corrugated foam sheets, multi-wall foam sheets, an integral sheet structure comprising a foam sheet and a reinforced skin as a top layer, and a multi-wall sheet structure comprising at least one foam sheet disposed between two or more plastic sheets. The foams may also comprise an energy absorbing material, a packaging material, a thermal insulation material, an acoustic insulation material, a building construction material, or a building glazing material. Foams comprising the energy absorbing material may be fabricated into various articles, such as automobile bumpers, which are sometimes required to be softer for pedestrian safety while also be able to meet barrier regulations. Transparent sheets comprising the nano-cellular foams may also be used as light diffusers, such as for example, display device diffusers. Further, the nano-cellular polymer foam can used for producing a super-structural foam or a super-insulating foam. In an embodiment, super-structural polymer foams have an average pore size from about 100 nanometers to about 500 nanometers. In other embodiments, the super-insulating foams have an average pore size from about 10 nanometers to about 200 nanometers, and from about 10 nanometers to about 100 nanometers. Some specific application areas for super-insulating foam include for example, buildings, refrigerators and refrigeration systems, heaters and heating systems, ventilation systems, air conditioners, ducting systems for transporting hot or cold materials, such as for example liquids, air, and other gases; and cold rooms. Super-insulation foamed structures may also be used for making high temperature turbine parts, such as for example, turbine blades. Super-structural and super-insulation foamed structures are used in building and construction panels, including opaque super-insulating sandwich panels. Some examples of applications of the nano-cellular polymer foams as a material having both super-structural properties and transparency include roof glazings, building glazings, construction glazings, automotive glazing. In some instances, a combination of the super-structural, super-insulating, and transparency properties of the foamed structures can also be used for many construction applications. Super-insulating foams comprising a flame retardant may also be useful for producing sandwich cores, which can be used for producing panels for use in air and surface transportation means, such as aircrafts, helicopters, trains, buses, ships, recreational vehicles, and the like. Ultra-low density nano-cellular polymer foams, that is foams having a density that is 1-10 percent of the bulk density of the polymer of which the foam is made of, can be used as sandwich panels having super-structural and super-insulating properties.

In another embodiment, panels or sheets comprising the nano-cellular polymer foams can comprise an airplane or an automobile outer structural component, a roof, a greenhouse roof, a stadium roof, a building roof, a window, a skylight, or a vehicular roof. Other applications of the nano-cellular polymer foam include those where they may comprise coating applications, for example, a conductive packaging material, an aircraft fuselage insulating material for noise and thermal insulation, a fuel tank coating, an aircraft fuel tank coating, an automotive fuel tank coating, and fuel storage tank coating. Further, the foams may comprise gas mixers, gas diffusers, liquid-gas separators, compact heat exchangers, and orthopaedic devices. Furthermore, the foam may comprise a membrane, a sensing device, a floating structure or a weatherable exterior panel. Some examples of specific floating structures include floating docks, marinas, fishing boats, life rafts, ship hulls, life belts, life jackets, and navigation buoys.

EXAMPLES

Example 1

Equation 4 is plotted for various values of the average pore size for a polymer foam. The plot, shown in FIG. 4 indicates that at a pore size below about 200 nanometers, the gas conduction, which accounts for the bulk of the foam conduction, begins to fall sharply. Thus, as the average pore size of the polymer foam approaches and falls below 200 nanometers, conduction of thermal energy by convection approaches $1 \times 10^{-6}$ watt meter$^{-1}$Kelvin$^{-1}$, and thereafter begins to drop sharply by orders of magnitude. Such polymer foams are therefore potentially useful as super-insulating nano-cellular polymer foams.

Examples 2-7

These Examples illustrate the relationship between the extinction coefficient and the wavelength for a given pore diameter/foam density set of values for a bisphenol A homopolycarbonate nano-cellular polymer foam. Polymer foam density is given in units of kilograms per cubic meter. The various pore diameters and foam densities for the plots are shown in Table 2. The plots, indicated by reference numerals 40-90, are shown in FIG. 5.

TABLE 2

| Example Number | Plot Reference Number | Pore Diameter (nanometers) | Foam density (kilograms per cubic meter) |
|---|---|---|---|
| 2 | 40 | 800 | 600 |
| 3 | 50 | 800 | 240 |
| 4 | 60 | 500 | 600 |
| 5 | 70 | 500 | 240 |
| 6 | 80 | 300 | 600 |
| 7 | 90 | 300 | 240 |

FIG. 5 clearly shows that for a given polymer, engineering the pore diameter (or pore size) and the foam density may be effective in reducing the extinction coefficient, and hence increasing transparency. For example, the plots having reference 50 and 90 show that the polymer foam having a pore diameter of 300 nanometers and a foam density of 240 kilograms per cubic meter has an extinction coefficient at 380 nanometers of less than 0.1, whereas the foam having the same density, but a pore diameter of 800 nanometers has an extinction coefficient at the same wavelength of about 0.7. The plots having reference numerals 40 and 80 show that the polymer foam having a pore diameter of 800 nanometers and a foam density of 600 kilograms per cubic meter has an extinction coefficient at about 500 nanometers of about 0.6, whereas the foam having the same density, but a pore diameter of 300 nanometers has an extinction coefficient at the same wavelength of less than 0.1.

Examples 8-11

These Examples show the results of simulation calculations of the effect of the average pore size and foam density on optical transparency to visible light (that is, light having wavelength in the range from 380 nanometers to 780 nanometers) of a bisphenol A homopolycarbonate foam having a density of 240 kilograms per cubic meter. The various pore diameters and foam densities for the plots are shown in Table 3.

TABLE 3

| Example Number | Plot Reference Number | Pore Diameter (nanometers) |
|---|---|---|
| 8 | 100 | 100 |
| 9 | 110 | 300 |
| 10 | 120 | 500 |
| 11 | 130 | 800 |

It may be seen from FIG. 6 that with decreasing pore size for a given foam density, the percent light transmission increases. Thus for example, the simulation results show that a BPA foam having an average pore size of about 100 nanometers and a foam density of about 240 kilograms per cubic meter may be essentially transparent over the wavelength range from 380 nanometers to 780 nanometers, as seen from plot 100. The bulk density of bisphenol A polycarbonate is about 1200 $kgm^{-3}$, which means that the foam density of the BPA polycarbonate foam is about 20 percent of the bulk density.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A nano-cellular polymer foam having:
    an average pore size from about 10 nanometers to about 200 nanometers;
    a cell density of greater than about $10_{12}$ cells per cubic centimeter; and
    a foam density that is from about 1 percent to about 50 percent of the bulk density of a material comprising the nano-cellular foam; and
    wherein the nano-cellular polymer foam comprises a thermal conductivity of about 0.001 to about 0.01 Watts per meter-Kelvin over a temperature range of about ambient temperature to about 350° C.

2. The nano-cellular polymer foam of claim 1, comprising an open cell structure, a closed cell structure, or combinations thereof.

3. The nano-cellular polymer foam of claim 1, having an average pore size standard deviation that is less than or equal to about 10 percent of the average pore size.

4. The nano-cellular polymer foam of claim 1, having a cell density of from about $10^{12}$ to about $10^{18}$ cells per cubic centimeter.

5. The nano-cellular polymer foam of claim 1, having a cell density of from about $10^{15}$ to about $10^{18}$ cells per cubic centimeter.

6. The nano-cellular polymer foam of claim 1, having a foam density that is 5-25 percent of the bulk density of the material of the nano-cellular polymer foam.

7. The nano-cellular polymer foam of claim 1, having a foam density that is 1-10 percent of the bulk density of the material of the nano-cellular polymer foam.

8. The nano-cellular polymer foam of claim 1, comprising a super-structural foam.

9. The nano-cellular polymer foam of claim 8, further comprising a super-insulating foam.

10. The nano-cellular polymer foam of claim 8, which is transparent to electromagnetic radiation.

11. The nano-cellular polymer foam of claim 1, comprising an energy absorbing material, a packaging material, a thermal insulation material, an acoustic insulation material, a building construction material, or a building glazing material.

12. The nano-cellular polymer foam of claim 1, comprising a super-insulating foam.

13. The nano-cellular polymer foam of claim 1, comprising a conductive packaging material, a fuel tank coating, an aircraft fuel tank coating, an automotive fuel tank coating, an aircraft fuselage insulating material, a display device diffuser, a membrane, a sensing device, a floating structure, a gas mixer, a gas diffuser, a liquid-gas separator, a compact heat exchanger, an orthopaedic device, or a weatherable exterior panel.

14. The nano-cellular polymer foam of claim 1, wherein the average pore size comprises a defect insensitive pore size.

15. An article comprising the foam of claim 1.

16. The article of claim 15, that is a nano-cellular foamed polymer extrudate.

17. The article of claim 15, wherein the nano-cellular foamed polymer extrudate comprises a sheet.

18. The article of claim 17, wherein the sheet comprises an integrated sandwich panel, a co-laminated panel, a co-extruded panel comprising an inner foam sheet, graded foam sheets, co-extruded foam sheets, corrugated foam sheets, multi-wall foam sheets, an integral sheet structure comprising a foam sheet and a reinforced skin as a top layer, and a multi-wall sheet structure comprising at least one foam sheet disposed between two or more plastic sheets.

19. A nano-cellular polymer foam having:
    an average pore size from about 10 nanometers to about 200 nanometers;
    a cell density of greater than about $10^{12}$ cells per cubic centimeter and a relative density that is from about 5 percent to about 50 percent of the bulk density of a material comprising the nano-cellular polymer foam;
    wherein the foam is made of a thermoplastic polymer, an amorphous polymer, or a semicrystalline polymer; and
    wherein the nano-cellular polymer foam comprises a thermal conductivity of about 0.001 to about 0.01 Watts per meter-Kelvin over a temperature range of about ambient temperature to about 350° C.

20. The nano-cellular polymer foam of claim 19, having a cell density of from about $10^{12}$ to about $10^{18}$ cells per cubic centimeter.

21. A nano-cellular polymer foam having:
    an average pore size from about 10 nanometers to about 200 nanometers;
    a cell density of greater than about $10_{12}$ cells per cubic centimeter; and
    a foam density that is from about 1 percent to about 50 percent of the bulk density of a material comprising the nano-cellular foam; and
    wherein the nano-cellular polymer foam comprises a gas conduction of less than or equal to $2 \times 10^{-2}$ Watts per meter-Kelvin.

22. The nano-cellular polymer foam of claim 21, having an average pore size standard deviation that is less than or equal to about 10 percent of the average pore size.

23. The nano-cellular polymer foam of claim 21, having a cell density of from about $10^{12}$ to about $10^{18}$ cells per cubic centimeter.

24. The nano-cellular polymer foam of claim 21, having a foam density that is 5-25 percent of the bulk density of the material of the nano-cellular polymer foam.

25. A method for producing a nano-cellular polymer foam, comprising:
    contacting a polymer with a foaming agent to form a homogeneous phase material, the polymer having an average particle size from about 10 nanometers to about 10 millimeters; and
    processing the homogeneous phase material to produce the nano-cellular polymer foam having an average pore size of about 10 nanometers to about 200 nanometers, a cell density of greater than about $10^{12}$ cells per cubic centimeter, and a foam density of about 1 percent to about 50 percent of the bulk density of a material comprising the nano-cellular foam; and
    wherein the nano-cellular polymer foam comprises a thermal conductivity of about 0.001 to about 0.01 Watts per meter-Kelvin over a temperature range of about ambient temperature to about 350° C.

26. The method of claim 25, comprising an extrusion technique for producing the nano-cellular polymer foam.

27. The method of claim 26, wherein said contacting and extrusion comprises a residence time that is from about 0.5 to about 0.9 times the time taken for diffusion of foaming agent out of the particles of the polymer.

28. The method of claim 26, wherein the extrusion technique is implemented continuously.

29. The method of claim 25, wherein the polymer comprises a thermoplastic polymer, an amorphous polymer, a thermoset polymer, or a semi-crystalline polymer.

30. The method of claim 29, wherein the thermoplastic polymer is selected from the group consisting of polyacetals, polyacrylics, polycarbonates polystyrenes, polyesters, polyamides, polyamideimides, polyarylates, polyarylsulfones, polyethersulfones, polyphenylene sulfides, polysulfones, polyimides, polyetherimides, polytetrafluoroethylenes, polytherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, and polyphosphazenes.

31. The method of claim 29, wherein the semi-crystalline polymer is selected from the group consisting of polyphenylene sulfides, polyetheretherketones, polyetherketones, phthalamides, polyetherketoneketones, polybutylene terephthalates, and high temperature nylons.

32. The method of claim 29, wherein the thermoplastic polymer comprises a polyetherimide or a polycarbonate.

33. The method of claim 25, wherein said contacting the polymer with the foaming agent is carried out at a temperature from about $-100°$ C. to about $20°$ C.

34. The method of claim 25, wherein said contacting the polymer with the foaming agent is carried out at a temperature from about $-40°$ C. to about $20°$ C.

35. The method of claim 25, wherein the foaming agent is a solid, a liquid, a gaseous, or a supercritical foaming agent.

36. The method of claim 25, wherein the foaming agent is selected from the group consisting of carbon dioxide, air, nitrogen, argon, gaseous hydrocarbons, and combinations thereof.

37. The method of claim 36, wherein the foaming agent is selected from the group consisting of solid carbon dioxide, liquid carbon dioxide, gaseous carbon dioxide, and supercritical carbon dioxide.

38. The method of claim 25, wherein said contacting is implemented at a pressure from ambient pressure to about 150 Newtons per meter squared.

39. The method of claim 25, wherein said average particle size is from about 10 nanometers to about 100 microns.

40. The method of claim 25, wherein said average particle size is from about 10 nanometers to about 1 millimeter.

* * * * *